(12) United States Patent
Moon et al.

(10) Patent No.: US 11,682,325 B2
(45) Date of Patent: Jun. 20, 2023

(54) DISPLAY APPARATUS INCLUDING FREE-FORMED SURFACE AND OPERATING METHOD THEREOF

(71) Applicant: SAMSUNG ELECTRONICS CO., LTD., Suwon-si (KR)

(72) Inventors: Seokil Moon, Suwon-si (KR); Changkun Lee, Seoul (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/512,245

(22) Filed: Oct. 27, 2021

(65) Prior Publication Data

US 2022/0343815 A1  Oct. 27, 2022

(30) Foreign Application Priority Data

Apr. 22, 2021  (KR) .......... 10-2021-0052530

(51) Int. Cl.
*G09G 3/00* (2006.01)
*G02B 27/01* (2006.01)

(52) U.S. Cl.
CPC .......... *G09G 3/003* (2013.01); *G02B 27/0103* (2013.01); *G02B 27/017* (2013.01);
(Continued)

(58) Field of Classification Search
CPC ........... G09G 3/003; G09G 2340/0464; G09G 2354/00; G09G 2380/10; G02B 27/0103; G02B 27/017; G02B 27/0172; G02B 2027/0134; G02B 2027/014; G02B 2027/0185; G02B 27/0101;
(Continued)

(56) References Cited

U.S. PATENT DOCUMENTS 16,690,921   6/2020  Ouderkirk et al.
2014/0226193 A1* 8/2014 Sun ............... G02B 27/0172
                                               359/19
(Continued)

FOREIGN PATENT DOCUMENTS

KR  10-2019-0116191 A  10/2019
WO   2018/091984 A1   5/2018

OTHER PUBLICATIONS

VisionSystemsDesign, "Freeform optical design software speeds AR and VR headsets to market", Jun. 2, 2018, https://www.vision-systems.com/sponsored/zemax/article/16752125/freeform-optical-design-software-speeds-ar-and-vr-headsets-to-market. (4 pages total).
(Continued)

*Primary Examiner* — Brent D Castiaux
(74) *Attorney, Agent, or Firm* — Sughrue Mion, PLLC

(57) ABSTRACT

Provided is a display apparatus including an image generator configured to time-sequentially generate a plurality of images by modulating light, and an optical system including a freeform surface that is configured to time-sequentially form a plurality of virtual images respectively corresponding to the plurality of images at different depths from a user's eye, wherein each error value among error values between the plurality of images and the plurality of virtual images respectively corresponding to the plurality of images on the freeform surface is less than or equal to a profile value of the freeform surface.

21 Claims, 16 Drawing Sheets

(52) U.S. Cl.
CPC .... *G02B 27/0172* (2013.01); *G02B 2027/014* (2013.01); *G02B 2027/0134* (2013.01); *G02B 2027/0185* (2013.01); *G09G 2340/0464* (2013.01); *G09G 2354/00* (2013.01); *G09G 2380/10* (2013.01)

(58) Field of Classification Search
CPC ........ G02B 27/0093; G02B 2027/0127; G02B 2027/0178; G02B 2027/0187; G03H 1/04; G06T 19/003; G06T 19/006
See application file for complete search history.

(56) References Cited

U.S. PATENT DOCUMENTS

| | | | |
|---|---|---|---|
| 2016/0109706 A1 | 4/2016 | Schowengerdt et al. | |
| 2017/0343799 A1* | 11/2017 | Ito | G06V 20/597 |
| 2018/0035103 A1 | 2/2018 | Sung et al. | |
| 2019/0178669 A1* | 6/2019 | Lee | G02B 27/0179 |
| 2019/0260982 A1* | 8/2019 | Hua | G06V 20/20 |
| 2020/0203324 A1 | 6/2020 | Shin et al. | |
| 2020/0209638 A1* | 7/2020 | Osmanis | H04N 13/395 |
| 2020/0240611 A1 | 7/2020 | Brand et al. | |

OTHER PUBLICATIONS

Kramida, "Resolving the Vergence-Accommodation Conflict in Head-Mounted Displays", Jul. 2016, IEEE Transactions on Visualization and Computer Graphics, vol. 22, No. 7, 20 pages total, XP011611904.

Communication dated Sep. 29, 2022 by the European Patent Office for European Patent Application No. 22169101.7.

* cited by examiner

DISPLAY APPARATUS INCLUDING FREE-FORMED SURFACE AND OPERATING METHOD THEREOF

CROSS-REFERENCE TO RELATED APPLICATION

This application is based on and claims priority under 35 U.S.C. § 119 to Korean Patent Application No. 10-2021-0052530, filed on Apr. 22, 2021, in the Korean Intellectual Property Office, the disclosure of which is incorporated by reference herein in its entirety.

BACKGROUND

1. Field

The disclosure relates to a display apparatus having a freeform surface and an operating method thereof.

2. Description of Related Art

Head-mounted displays for providing virtual reality (VR) have currently reached the commercialization stage and are widely used in the entertainment industry. Furthermore, the head-mounted displays have been developed into a form that is applicable to the medical, educational, and industrial fields.

Augmented reality (AR) displays, an advanced form of virtual reality displays, are imaging devices that combine the real world and virtual reality, and have a feature of inducing an interaction between the real word and virtual reality. The interaction between the real world and virtual reality is based on a function that provides in real time information about a real situation, and the effect of the real world can be further increased by superimposing virtual objects or information on the environment of the real world.

SUMMARY

One or more example embodiments provide a display apparatus for providing a plurality of images having different depth information using a freeform surface, and an operating method thereof.

Additional aspects will be set forth in part in the description which follows and, in part, will be apparent from the description, or may be learned by practice of example embodiments of the disclosure.

According to an aspect of an example embodiment, there is provided a display apparatus including an image generator configured to time-sequentially generate a plurality of images by modulating light, and an optical system including a freeform surface that is configured to time-sequentially form a plurality of virtual images respectively corresponding to the plurality of images at different depths from a user's eye, wherein each error value among error values between the plurality of images and the plurality of virtual images respectively corresponding to the plurality of images on the freeform surface is less than or equal to a profile value of the freeform surface.

The error values may be based on a difference in pixel values of pixels provided between the plurality of images generated in the image generator and the plurality of virtual images respectively corresponding to the plurality of images, on the freeform surface.

The profile value of the freeform surface may correspond to minimum values of a sum of the error values between the plurality of images and the plurality of virtual images respectively corresponding to the plurality of images.

The freeform surface may be further configured to form the plurality of virtual images at different depths based on an optical path length between each of the plurality of images and the freeform surface.

As the optical path length between each of the plurality of images generated in the image generator and the freeform surface decreases, a depth of each of the plurality of virtual images corresponding to the plurality of images may increase.

The display apparatus may further include a processor configured to control the image generator based on at least one of depth information included in image information or information with respect to a depth that a user observes.

The display apparatus may further include a driver configured to adjust a positon of the image generator such that the image generator is configured to generate the plurality of images at different positions based on control of the processor.

The driver may include a shape changeable member configured to adjust a position of the image generator based on a change of a shape of the shape changeable member based on a signal applied to the driver.

The shape changeable member may include a material having a shape that changes by heat.

The driver may include at least one of a shape memory alloy or an electroactive polymer.

The processor may be further configured to generate a computer-generated hologram from the image information, and the image generator is further configured to generate the plurality of images having different representative depths based on the computer-generated hologram received from the processor.

The display apparatus may further include an eye tracking sensor configured to track a depth that the user observes, wherein the processor may be further configured to control the image generator such that each of the plurality of virtual images are formed at the depth that the user observes.

The optical system may be a combiner configured to converge the plurality of virtual images and external light corresponding to an external environment into one focus point, and wherein the freeform surface may be integrated with the combiner.

The combiner may include a transparent waveguide configured to transmit the plurality of virtual images, and the freeform surface may be provided at a surface of the transparent waveguide.

The combiner may further include a transflective film provided at the freeform surface.

The display apparatus may include an augmented reality apparatus.

According to another aspect of an example embodiment, there is provided a method of operating a display apparatus including a freeform surface, the method including time-sequentially generating a plurality of images, by an image generator, by modulating light, and time-sequentially forming, by the freeform surface, a plurality of virtual images respectively corresponding to the plurality of images at different depths, wherein each error value among error values between the plurality of images and the plurality of virtual images respectively corresponding to the plurality of images on the freeform surface is less than or equal to a profile value of the freeform surface.

The error values may be based on a difference in pixel values of pixels between the plurality of images generated in the image generator and the plurality of virtual images respectively corresponding to the plurality of images, on the freeform surface.

The profile value of the freeform surface may correspond minimum values of a sum of the error values between the plurality of images and the plurality of virtual images respectively corresponding plurality of images.

In the forming of the plurality of virtual images, the plurality of virtual images may be formed at different depths based on an optical path length between each of the plurality of images and the freeform surface.

An optical path length between the plurality of images generated in the image generator and the freeform surface decreases, a depth of each of the plurality of virtual images corresponding to the plurality of images may increase.

The method may further include tracking a depth that a user observes, wherein, in the forming of the plurality of virtual images, each of the plurality of virtual images is formed at the depth that the user observes.

The image generator may include a light source, a lens, and a spatial light modulator.

According to another aspect of an example embodiment, there is provided a display apparatus including an image generator configured to time-sequentially generate a plurality of images by modulating light, and an optical system including a freeform surface that is configured to time-sequentially form a plurality of virtual images respectively corresponding to the plurality of images at different depths from a user's eye, a driver configured to adjust a distance between the image generator and the optical system, wherein each error value among error values between the plurality of images and the plurality of virtual images respectively corresponding to the plurality of images on the freeform surface is less than or equal to a profile value of the freeform surface, and wherein the profile value corresponds to minimum values of a sum of the error values between the plurality of images and the plurality of virtual images respectively corresponding to the plurality of images.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
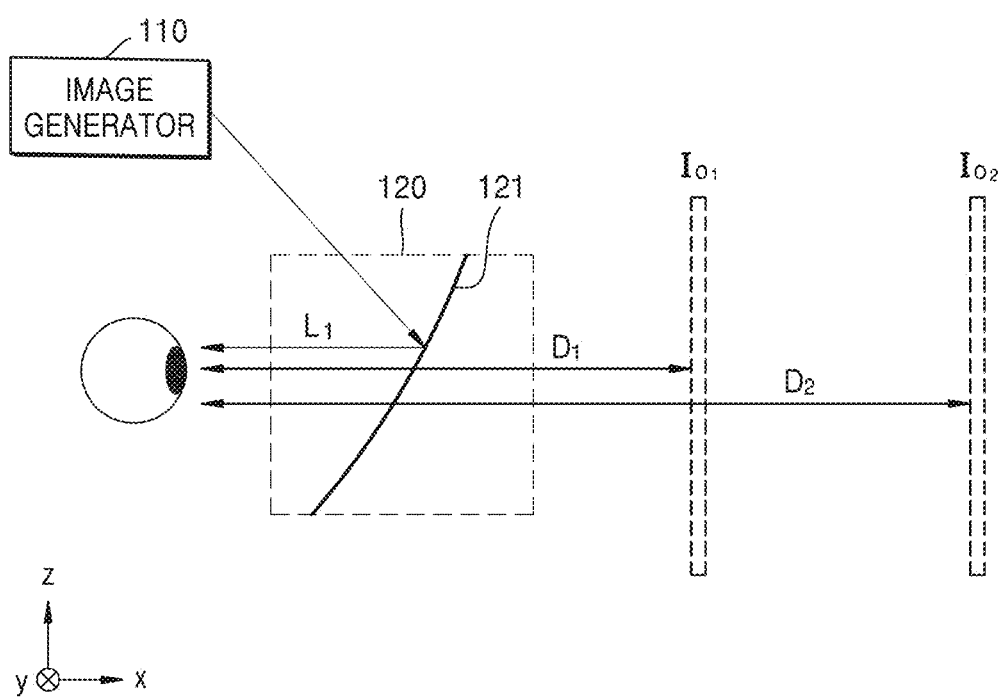
FIG. 1 is a schematic view of a configuration of a display apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a display apparatus 10 including a freeform surface is described in detail with reference to the accompanying drawings. Throughout the drawings, like reference numerals denote like elements. Sizes of components in the drawings may be exaggerated for convenience of explanation. In the above, although example embodiments have been described, these are merely examples, and those skilled in the art to which the present disclosure pertains could make various modifications and changes from these descriptions.

When a constituent element is disposed "above" or "on" to another constituent element, the constituent element may be only directly on the other constituent element or above the other constituent elements in a non-contact manner. An expression used in a singular form in the specification also includes the expression in its plural form unless clearly specified otherwise in context. When a part may "include" or "comprise" a certain constituent element, unless specified otherwise, it may not be construed to exclude another constituent element but may be construed to further include other constituent elements.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. The disclosure is not limited to the described order of the steps.

Furthermore, terms such as "~portion," "~unit," "~module," and "~block" stated in the specification may signify a unit to process at least one function or operation and the unit may be embodied by hardware, software, or a combination of hardware and software.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

Also, the steps of all methods described herein can be performed in any suitable order unless otherwise indicated herein or otherwise clearly contradicted by context. The disclosure is not limited to the described order of the steps.

Furthermore, the use of any and all examples, or language (e.g., "such as") provided herein, is intended merely to better illuminate the disclosure and does not pose a limitation on the scope of the disclosure unless otherwise claimed.

Figure 2:
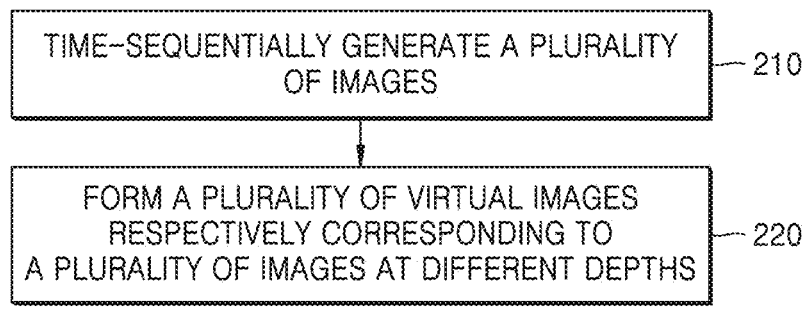
FIG. 2 is a flowchart of a method of operating a display apparatus, according to an example embodiment.

FIG. 1 is a schematic view of a configuration of the display apparatus 10 according to an example embodiment, and FIG. 2 is a flowchart of a method of operating a display apparatus, according to an example embodiment. Referring to FIGS. 1 and 2, the display apparatus 10 according to an example embodiment may include an image generator 110 for time-sequentially generating a plurality of images and an optical system 120, in which a freeform surface 121 for time-sequentially forming a plurality of virtual images respectively corresponding to the images at different depths, is arranged.

The image generator 110 may time-sequentially generate a plurality of images by modulating light (S210). The image generated in the image generator 110 may be, for example, a stereo image provided to each of the left eye and the right eye of an observer, a holographic image, a light field image, an integral photography (IP) image, and the like, and may include a multi-view or super multi-view type image. Furthermore, the image generated in the image generator 110 is not limited thereto, and may be a two-dimensional image.

The image generator 110 may include, for example, a liquid crystal on silicon (LCoS) device, a liquid crystal display (LCD) device, an organic light-emitting diode (OLED) device, a digital micromirror device (DMD), next generation displays such as a micro LED, a quantum dot (QD) LED, and the like. When the image generator 110 is a self-luminous display such as an OLED display, a micro LED, and the like, the image generator 110 may include one display panel. When the image generator 110 is a non-luminous display such as an LCoS device, an LCD device, and the like, the image generator 110 may further include a light source 410 that provides illuminating light, an optical system for adjusting a path of the illuminating light, and the like.

The freeform surface 121 may time-sequentially form a plurality of virtual images respectively corresponding to a plurality of images at different depths, for example, at different depths from the observer's eye. For example, the image generated in the image generator 110 may be reflected from the freeform surface 121 and transferred to the observer's eye. The observer may perceive that an image is formed at a specific depth image, based on an optical path length between the image generated in the image generator 110 and the freeform surface 121. The observer perceives an image located at a position different from the image generated by the image generator 110, and the image perceived by the observer may be referred to as the virtual image.

The freeform surface 121 may be a curved surface that is optimally designed to condense off-axially input light at one focus point or convert entire light that is input in a direction inclined with respect to an optical axis. The above-described profile value of the freeform surface 121 may be designed through an optimization process satisfying various conditions such as the viewing angle of a virtual image perceived by the observer, the thickness of the optical system 120 including the freeform surface 121, the size of an eye box, the position of the image generator 110, and the like. Accordingly, when the optical conditions for designing the freeform surface 121 and the optical conditions for using the freeform surface 121 change even slightly, the observer may perceive a low quality virtual image.

When the freeform surface 121 is designed optically for a single focus, the freeform surface 121 may have a quality virtual image that is formed at one depth, while the quality of a virtual image formed at a different depth may deteriorate. As a cognitive depth perceived by both eyes of the observer continuously changes, when the freeform surface 121 provides a virtual image having one depth information, the observer may feel dizzy due to a difference between the depth provided by the virtual image and the depth perceived by the observer.

Figure 3:
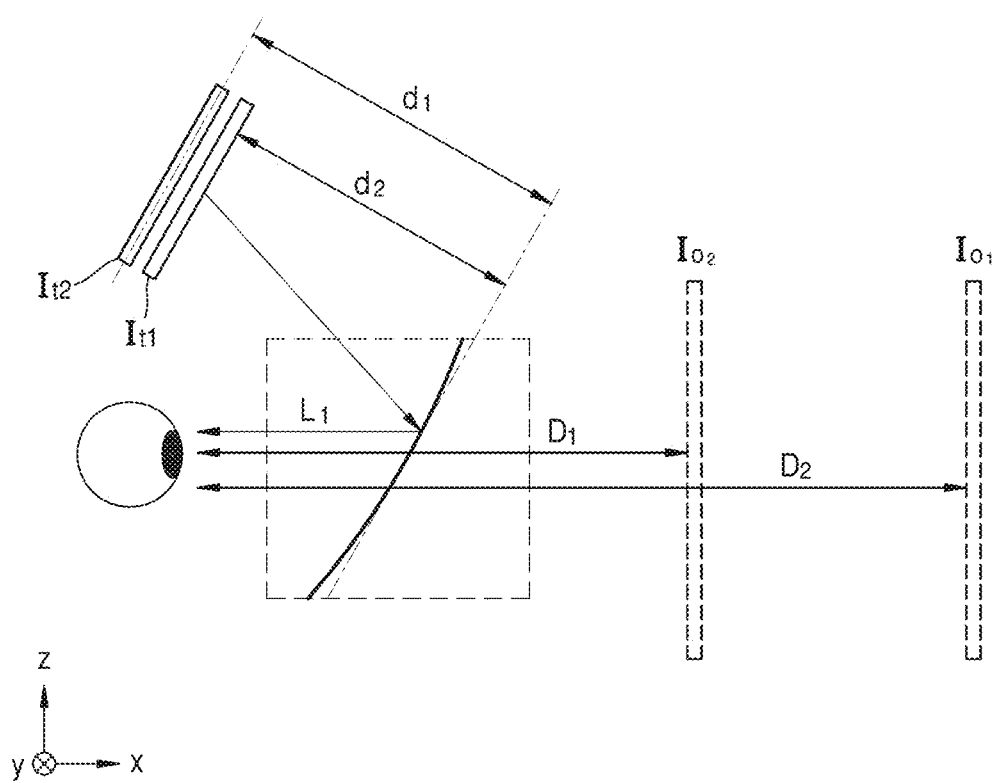
FIG. 3 is a reference view of a method of designing a freeform surface, according to an example embodiment.

The freeform surface 121 according to an example embodiment may include a curved surface designed such that a plurality of images are clearly formed at different depths. FIG. 3 is a reference view of a method of designing a freeform surface 121, according to an example embodiment. Under the same conditions as the display apparatus 10, a first object image $I_{o1}$ and a second object image $I_{o2}$ are positioned at positions where virtual images are to be formed, and a first target image $I_{t1}$ and a second target image $I_{t2}$ are positioned at positions where the images generated by the image generator 110 are to be formed. Accordingly, a curved surface profile satisfying a condition for minimizing errors between the first and second target images $I_{t1}$ and $I_{t2}$ and the first and second object images $I_{o1}$ and $I_{o2}$ may be designed. The errors between the first and second target images $I_{t1}$ and $I_{t2}$ and the first and second object images $I_{o1}$ and $I_{o2}$ may be based on a difference in pixel values of corresponding pixels between the first and second target images $I_{t1}$ and $I_{t2}$ and the first and second object images $I_{o1}$ and $I_{o2}$. For example, each of the errors between the first and second target images $I_{t1}$ and $I_{t2}$ and the first and second object images $I_{o1}$ and $I_{o2}$ may be the square of the absolute value of the difference in the values of corresponding pixels between the first and second target images $I_{t1}$ and $I_{t2}$ and the first and second object images $I_{o1}$ and $I_{o2}$.

To form a clear virtual image at a plurality of depths, the first object image $I_{o1}$ may be positioned at a first depth $D_1$ where a virtual image is to be formed, and the first target image $I_{t1}$ may be positioned at a first position $d_1$, corresponding to the first depth $D_1$, where the image generated by the image generator 110 is to formed. The second object image $I_{o2}$ may be positioned at a second depth $D_2$ where a virtual image is to be formed, and the second target image $I_{t2}$ may be positioned at a second position $d_2$, corresponding to the second depth $D_2$, where the image generated by the image generator 110 is to be formed.

Then, a curved surface profile satisfying a condition for minimizing the sum of an error $\|I_{t1}-I_{o1}(f(x,y), d1, D1)\|^2$ between the first target image $I_{t1}$ and the first object image $I_{o1}$ and an error $\|I_{t2}-I_{o2}(f(x, y), d2, D2)\|^2$ between the second target image $I_{t2}$ and the second object image $I_{o2}$ may be designed.

Equation 1 below represents a curved surface profile in each area of the freeform surface 121 where a clear virtual image is formed at two different depths D1 and D2.

$$\min\{\|I_{t1}-I_{o1}(f(x,y),d1,D1)\|^2+\|I_{t2}-I_{o2}(f(x,y),d2,D2)\|^2\} \quad \text{[Equation 1]}$$

FIG. 3 illustrates the curved surface profile of the freeform surface 121 for providing a clear virtual image at two depths. However, the curved surface profile of the freeform surface 121 may provide a clear virtual image at three or more depths.

Equation 2 below represents a curved surface profile of the freeform surface 121 for providing a clear virtual image at k depths, where k is a natural number equal to or greater than 2.

$$\min\left\{\sum_{n=1}^{k}\|I_{tn} - I_{on}(f(x, y), dn, Dn)\|^2\right\}. \quad \text{[Equation 2]}$$

Here, $I_{tn}$ is a target image generated at a position $d_n$, $I_{on}(f(x, y), d_n, D_n)$ is a virtual image formed at a depth $D_n$, and $\|I_{tn} - I_{on}(f(x, y), dn, Dn)\|^2$ is an error between $I_{tn}$ and $I_{on}$.

Figure 4A:
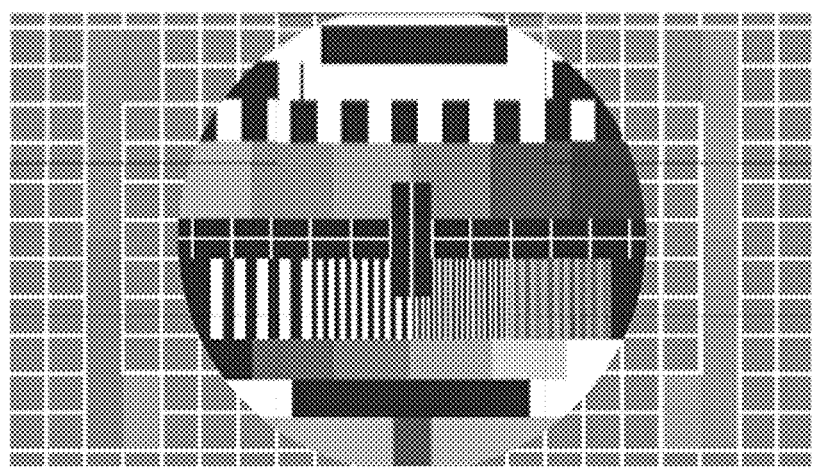
FIGS. 4A and 4B show a result of observing a virtual image by using a freeform surface optimized for a single depth.
Figure 4B:
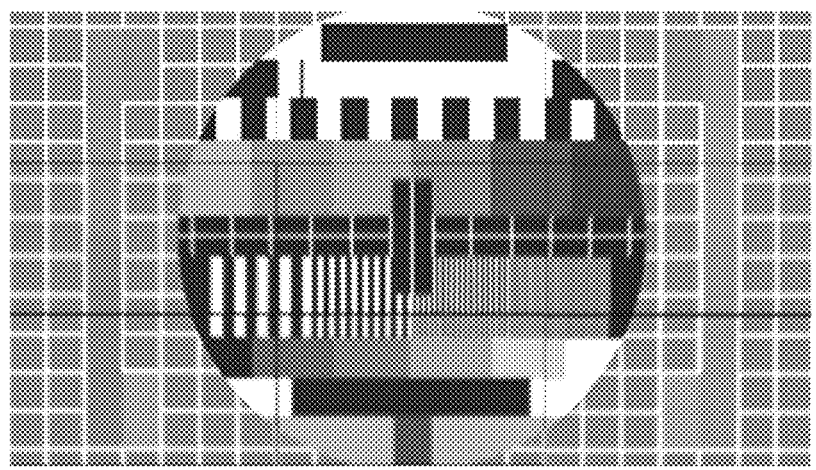

FIGS. 4A and 4B show a result of observing a virtual image by using a freeform surface optimized for a single depth. A freeform surface optimized for a virtual image to be formed at the first depth $D_1$ is designed. When an image is generated after the image generator 110 is positioned at the first position $d_1$, as illustrated in FIG. 4A, the observer may observe a clear virtual image.

When an image is generated after the image generator 110 is positioned at the second position $d_2$, as illustrated in FIG. 4B, a virtual image is formed at the second depth $D_2$, and the observer may observe a virtual image that has a poor quality and is out of focus.

Figure 5A:
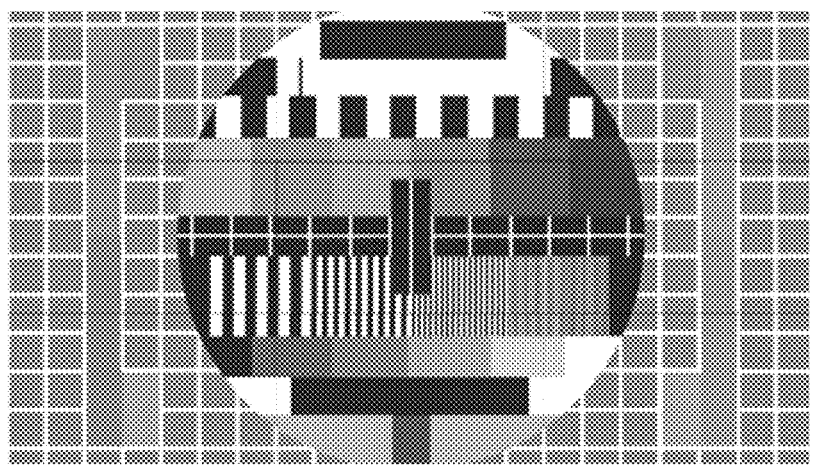
FIGS. 5A and 5B show a result of observing a virtual image by using a freeform surface optimized for two depths.
Figure 5B:
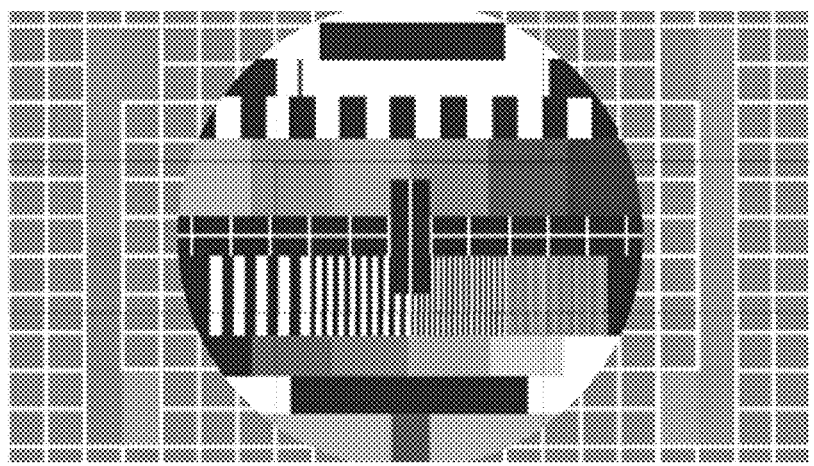

FIGS. 5A and 5B show a result of observing a virtual image by using a freeform surface optimized for two depths according to an example embodiment. A freeform surface optimized for a virtual image to be formed at the first and second depths $D_1$ and $D_2$ is designed. When an image is generated after the image generator 110 is positioned at the first position $d_1$, as illustrated in FIG. 5A, a virtual image is formed at $D_1$, and the observer may observe a clear virtual image.

When an image is generated after the image generator 110 is positioned at the second position $d_2$, as illustrated in FIG. 5B, a virtual image is formed at $D_2$, and the observer may observe a clear virtual image.

As described above, the observer may observe an excellent quality virtual image at different depths through the freeform surface 121 optimized for a plurality of depths according to an example embodiment.

Figure 6:
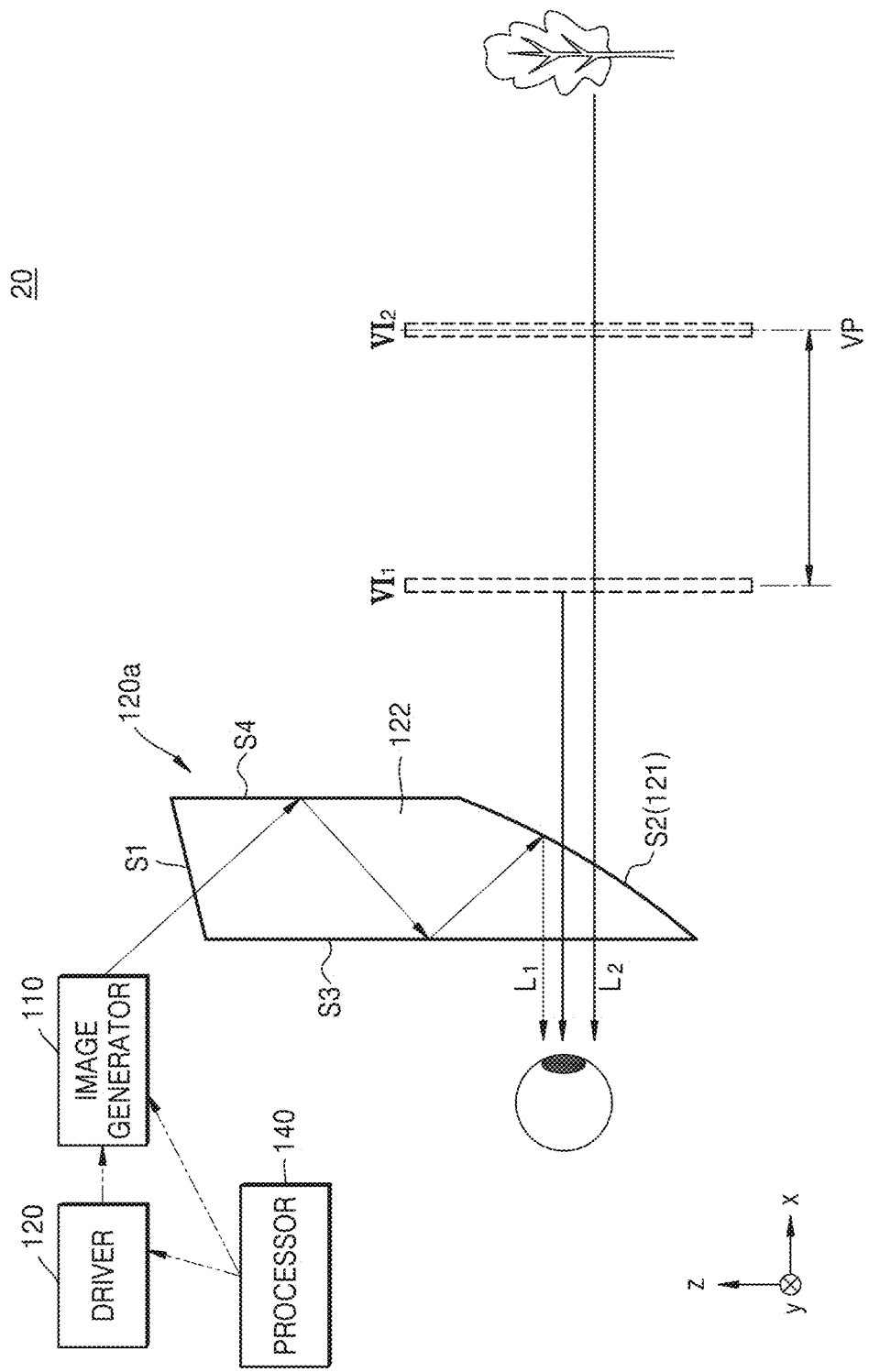
FIG. 6 is a view of a display apparatus including a freeform surface, according to an example embodiment.

FIG. 6 is a view of a display apparatus 20 including the freeform surface 121, according to an example embodiment. Comparing FIG. 1 with FIG. 6, the display apparatus 20 of FIG. 6 may include the image generator 110, a combiner 120*a* as an optical system for providing to an observer by mixing a virtual image and real light containing external environment, a driver 130 for driving the image generator 110 to vary the position of the image generator 110, and a processor 140 for controlling the image generator 110 and the driver 130 according to image information.

The combiner 120*a* may transfer to the observer's eye not only light $L_1$ containing the image generated in the image generator 110, but also light $L_2$ containing the external environment in front of the observer. For example, the combiner 120*a* may reflect the light $L_1$ containing an image toward the observer's eye and transmit the light $L_2$ containing the external environment toward the observer's eye.

The external light $L_2$ may contain a real scenery existing in front of the observer, not a separate image generated in the image generator 110. Accordingly, the observer may simultaneously perceive an artificial image from the image generator 110 and a real foreground. Accordingly, the display apparatus 10 may function as a see-through type display.

The combiner 120*a* may include a waveguide 122 for transferring the image generated in the image generator 110. The waveguide 122 may include a plurality of surfaces, and at least one of the surfaces may include the freeform surface 121.

As illustrated in FIG. 6, the waveguide 122 may include a first surface S1 and a second surface S2 that is the freeform surface 121, which are arranged to face each other, and a third surface S3 and a fourth surface S4, which are arranged to face each other between the first surface S1 and the second surface S2. Although the second surface S2 is illustrated as the freeform surface 121, embodiments are not limited thereto. For example, the first surface S1 may be a freeform surface. The third surface S3 and the fourth surface S4 may be arranged parallel to each other not to have refractive power.

In the display apparatus 20 according to an example embodiment, the position of a surface where a virtual image is arranged, that is, a virtual plane VP, is not fixed to a single value, but the position of the virtual plane VP may be changed by reflecting a sense of depth of an image to be displayed. To this end, the display apparatus 20 may further include the driver 130 for driving the position of the image generator 110.

The driver 130 may move the image generator 110 so as to vary a distance from the freeform surface 121. As the distance between the image generator 110 and the freeform surface 121, that is, an optical path length between the image generated in the image generator 110 and the freeform surface 121, decreases, the depth of the virtual image corresponding to the image generated in the image generator 110 may increase. However, embodiments are not limited thereto. The driver 130 may tilt the image generator 110 corresponding to a predesigned depth of the freeform surface 121

The driver 130 may include a shape changeable material to increase a driving range of the image generator 110 with keeping the driver 130 compact in size. For example, the driver 130 may be deformed in response to an applied signal and may provide a driving force to the image generator 110. For such a shape change, a material having a shape that is changeable by heat may be employed in the driver 130. The driver 130 may include a shape memory alloy (SMA) or an electroactive polymer (EAP). The change of the position of the image generator 110 by the driving of the driver 130 is described in detail with reference to FIG. 7.

The processor 140 may generate a light modulation signal to control the image generator 110 and a driving signal to control the driver 130, based on the image information. Accordingly, the image generator 110 may generate an image at a specific position under the control of the processor 140.

The display apparatus 20 may further include a memory. In addition to the image information, various pieces of data, program codes, and the like, needed for driving of the image generator 110 may be stored in the memory.

The image information may include color information and depth information about each image of a frame unit. The processor 140 may generate the light modulation signal for implementing a color value determined with reference to color information for each pixel with respect to each image of a frame unit included in the image information.

When the depth information including the image information is depth information of the frame unit, the processor 140 may generate a driving signal based on the depth information.

When the depth information is not the depth information of the frame unit, for example, depth information of a sub-image in a frame or for each pixel, the processor 140 may determine a representative length of the frame unit, and generate the driving signal based on the representative depth.

The processor 140 may determine a representative depth with respect to each image of the frame unit, by using the color information and/or depth information included in the image information.

For example, the processor 140 may determine the representative depth by extracting a color map from the image information and analyzing contents of the color map and/or saliency information, and the like. The saliency information analysis may be performed to determine an area that the observer is highly likely to observe, for example, an area with high visual concentration. To determine an area with high visual concentration, brightness, color, contour, object size, and the like may be considered. For example, an area with high brightness or color difference relative to the surroundings, an area having strong contour characteristics, or an area having a large object size may be an area with high visual concentration. A depth value corresponding to the above areas may be determined to be a representative depth. According to another example embodiment, a position with high visual concentration may be determined according to the contents included in an image.

In addition, the processor 140 may determine a representative depth considering a zone of comfort from the depth map, or quantize the depth information included in the depth map and determine a representative depth based on the quantized depth information.

The processor 140 may generate a driving signal according to the determined representative depth. The driving signal may be, for example, an electrical signal for generating heat appropriate for the deformation of the shape changeable material of the driver 130. The driving signal may be transmitted to be delayed by a certain time than the light modulation signal. The certain time may be set to be over a vergence-accommodation time of the observer's eye. This is to consider a time needed for a person's eye to perceive a virtual image at a changed depth.

Figure 7:
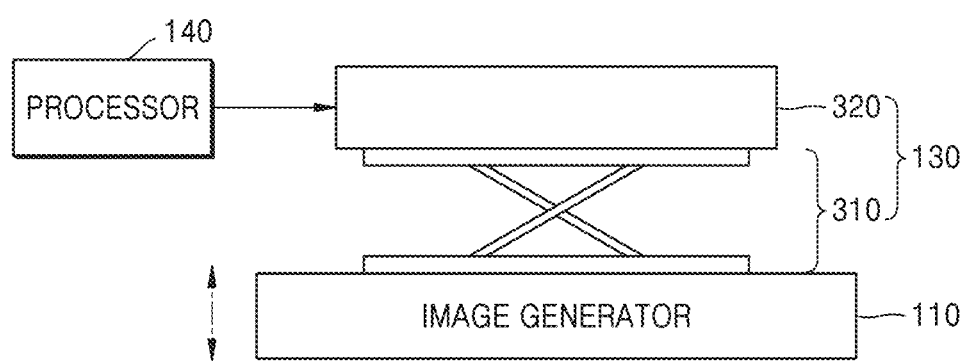
FIG. 7 is a view of an example of a driver of FIG. 6.

FIG. 7 is a view of an example of the driver 130 of FIG. 6. The driver 130 may include a pair of deformation portions 310 that are deformable in response to the driving signal to adjust the position of the image generator 110 and a fixed portion 320 that supports the deformation portions 310 and is fixed to a specific position.

The deformation portions 310 may be arranged between the fixed portion 320 and the image generator 110. Both end portions of each of the deformation portions 310 may respectively contact the fixed portion 320 and the image generator 110. Although the deformation portions 310 are illustrated as a pair, this is merely an example. In some example embodiments, one deformation portion or three or more deformation portions may be provided as the deformation portions 310.

When an electrical signal is applied to the deformation portions 310 and the temperature of the deformation portions 310 increases, the length of each of the deformation portions 310 may decrease. In this case, the image generator 110 may be closer to the fixed portion 320, that is, a distance between the image generator 110 and the freeform surface 121 may increase.

As the temperature of the deformation portions 310 is controlled, a degree of a length change of each of the deformation portions 310 may be adjusted, the distance between the image generator 110 and the freeform surface 121 may be controlled.

According to another example embodiment, the deformation portions 310 may have a wire shape. The length of each of the deformation portions 310 may be changed depending on the temperature of the deformation portions 310 or an electric field formed in the deformation portions 310. For example, the deformation portions 310 may include SMA, EAP, and a combination thereof. When the deformation portions 310 include SMA, the deformation portions 310 may have a shorter length at a higher temperature, and a longer length at a lower temperature. When the deformation portions 310 include EAP, and an electric field is applied to the deformation portions 310, the length of each of the deformation portions 310 may increase in a direction perpendicular to an applied electric field. In the following description, described is an example which the deformation portions 310 are deformed according to the temperature.

The temperature of the deformation portions 310 may be adjusted by an electrical signal applied to the deformation portions 310. The electrical signal is based on the driving signal transmitted from the processor 140, and the electrical signal may be a current signal or a voltage signal. For example, as a current is applied to the deformation portions 310, the temperature of the deformation portions 310 may be increased. When no current is applied to the deformation portions 310, the temperature of the deformation portions 310 may be decreased.

Although in FIGS. 6 and 7 the depth of a virtual image is adjusted by changing the position of the image generator 110 using the driver 130, embodiments are not limited thereto. When the image generator 110 generates a hologram image, the depth of a virtual image may be differently implemented by changing a hologram surface of a hologram image.

Figure 8:
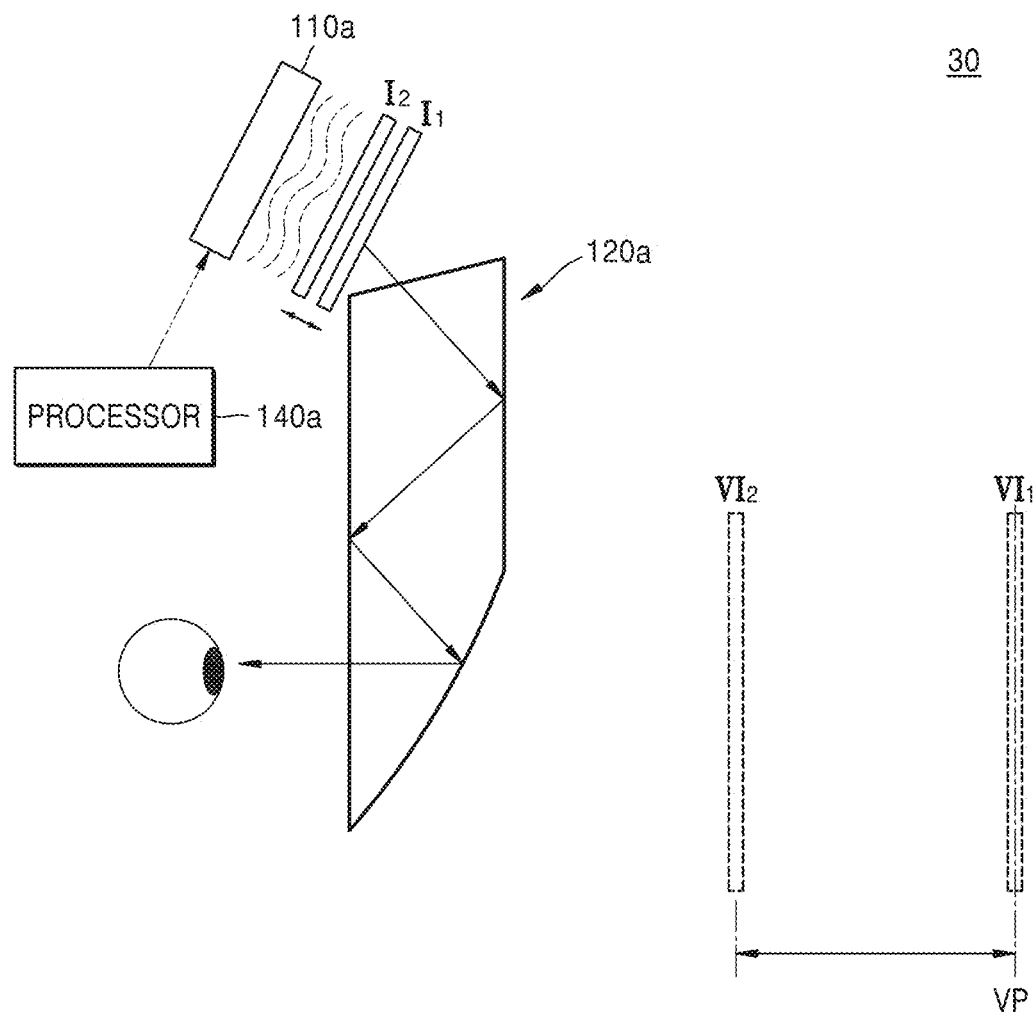
FIG. 8 is a view of a hologram display apparatus including a freeform surface, according to an example embodiment.
Figure 9:
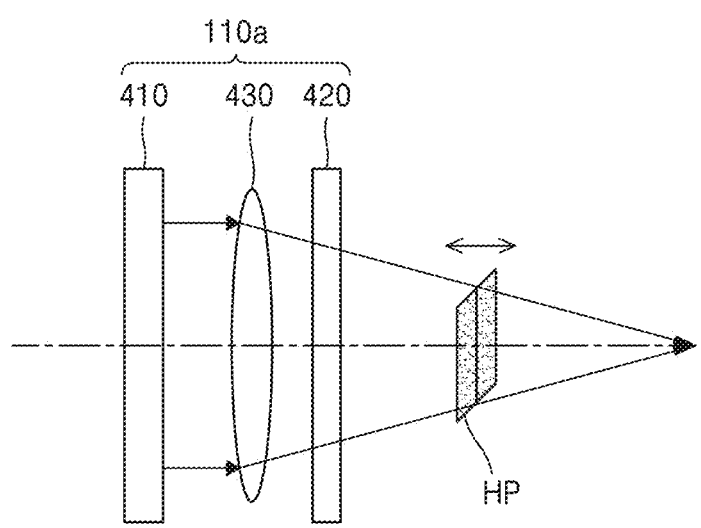
FIG. 9 is a view of an image generator for generating a hologram image of FIG. 8.

FIG. 8 is a view of a hologram display apparatus 30 including the freeform surface 121, according to an example embodiment. FIG. 9 is a view of an image generator 110a for generating the hologram image of FIG. 8. Referring to FIG. 8, the hologram display apparatus 30 may include an image generator 110a for generating a hologram image, a freeform optical system 120a for forming a plurality of virtual images having different depths from time-sequentially generated hologram images, and a processor 140a for generating a computer-generated hologram (CGH) from the image information, and providing the CGH to a spatial light modulator 420 (FIG. 9).

Referring to FIG. 9, the image generator 110a may include the light source 410 for providing coherence light, the spatial light modulator 420 for generating a hologram image by diffraction, and a focus optical system 430 for forming a hologram image in a certain space.

The light source 410 may include, for example, a laser diode. However, when light has a certain degree of spatial coherence, the light may have coherence by being diffracted and modulated by the spatial light modulator 420. Thus, other light source capable of emitting light having a certain degree of spatial coherence may be used.

The spatial light modulator 420 may generate a hologram image by diffracting input light. A hologram method utilizes a principle of regenerating an object wave when a reference wave is radiated to a hologram that records interference fringes between the object wave and the reference wave. For example, a CGH may be used for forming the interference fringes.

The focus optical system 430 displays a holographic image according to the depth information included in the image information. The focus optical system 430 may include a configuration that varies a focal position to allow the holographic image generated in the spatial light modulator 420 to be displayed in a space different from the spatial light modulator 420, that is, on a hologram plane HP.

The focus optical system 430 may include one or more lenses. The one or more lenses may be configured to have a variable curvature or to move in an optical axis direction. Accordingly, the focal position is changeable and the position of the hologram plane HP on which a hologram image is displayed may be variable.

The processor 140 may determine the representative depth of the hologram plane HP to display a hologram image from three-dimensional image information, and generate a CGH corresponding to the representative depth based on the three-dimensional image information. The processor 140 may determine the representative depth by analyzing the color information and the depth information included in the three-dimensional image information. As the method of determining a representative depth is already described above, a detailed description thereof is omitted.

Under the control of the processor 140, the spatial light modulator 420 may display a hologram image on the hologram plane HP corresponding to the representative depth, and the hologram image is reflected by the freeform surface 121, thereby forming a virtual image corresponding to a plurality of hologram images having different depths.

Although the representative depth of an image is extracted from the image information, embodiments are not limited thereto. The display apparatus 10 may track a depth that the observer observes and provide depth information about a virtual image.

Figure 10:
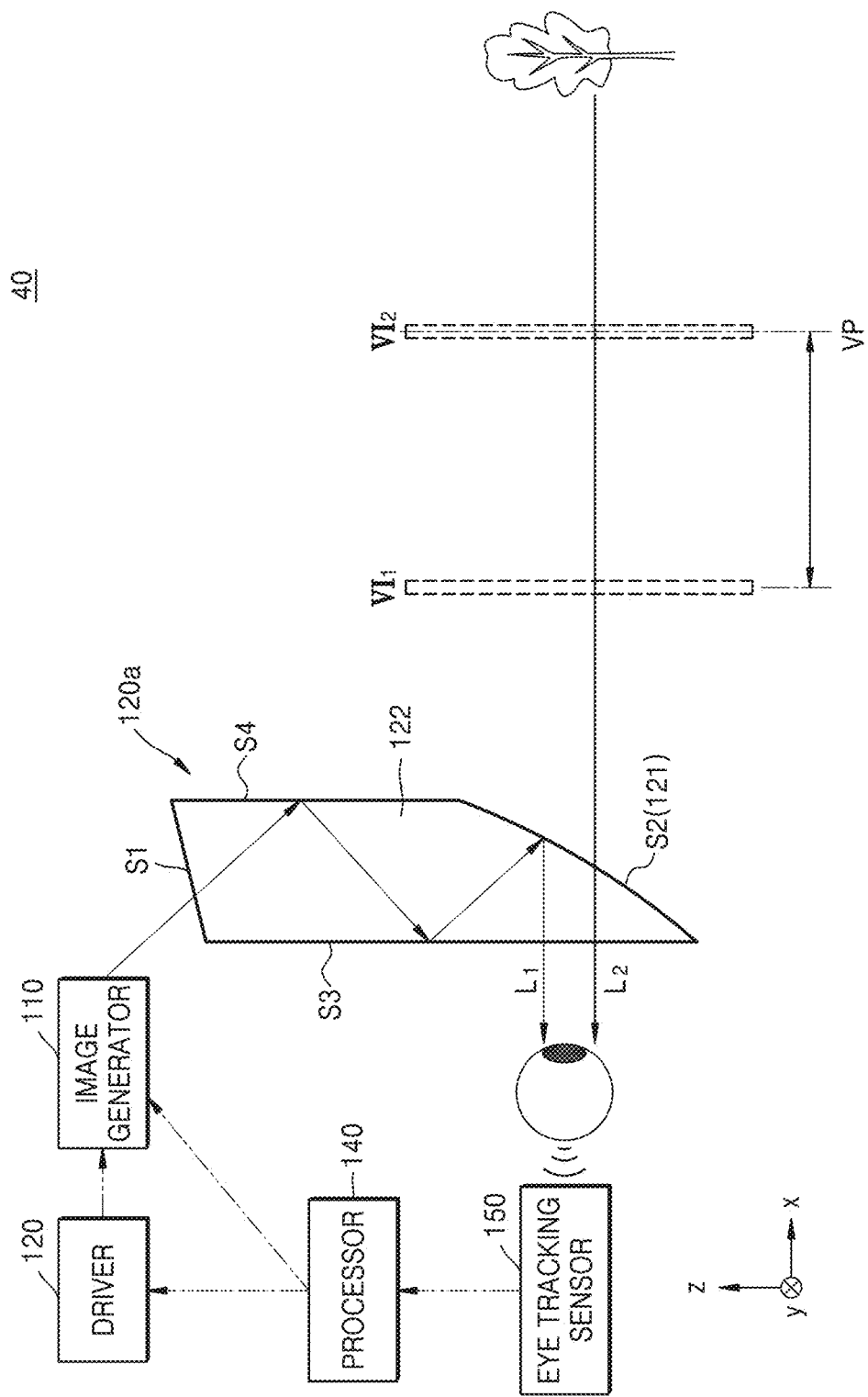
FIG. 10 is a view of a display apparatus including an eye tracking sensor, according to an example embodiment.

FIG. 10 is a view of a display apparatus 40 including an eye tracking sensor 150, according to an example embodiment. As illustrated in FIG. 10, the display apparatus 40 may further include an eye tracking sensor 150 for tracking a depth that the observer observes.

The eye tracking sensor 150 may obtain information about a depth that the observer observes, by tracking the position and direction of the observer's eye. For example, the eye tracking sensor 150 may obtain information about a depth that the observer observes, by using a technology of detecting a gaze direction using corneal reflex of an infrared ray. However, embodiments are not limited thereto. The eye tracking sensor 150 may obtain an image of a pupil by using computer vision technology, and track a change in the position of the pupil using the obtained image. The eye tracking sensor 150 may obtain information about a depth that the observer observes, by using a pupil's position change. The eye tracking sensor 150 may provide the obtained depth information to the processor 140. The eye tracking sensor 150 may include an infrared camera, a visible light camera, or various other sensors.

The processor 140 may determine the representative depth of an image based on the information about a depth that the observer observes received from the eye tracking sensor 150. The processor 140 may generate the driving signal of the driver 130 according to the above representative depth, or generate a CGH corresponding to the representative depth. As the image display corresponding to the representative depth is already described above, a detailed description thereof is omitted.

Although FIG. 10 illustrates that one surface of a waveguide is formed as the freeform surface 121, embodiments are not limited thereto. The freeform optical system 120a may include elements other than the waveguide.

Figure 11:
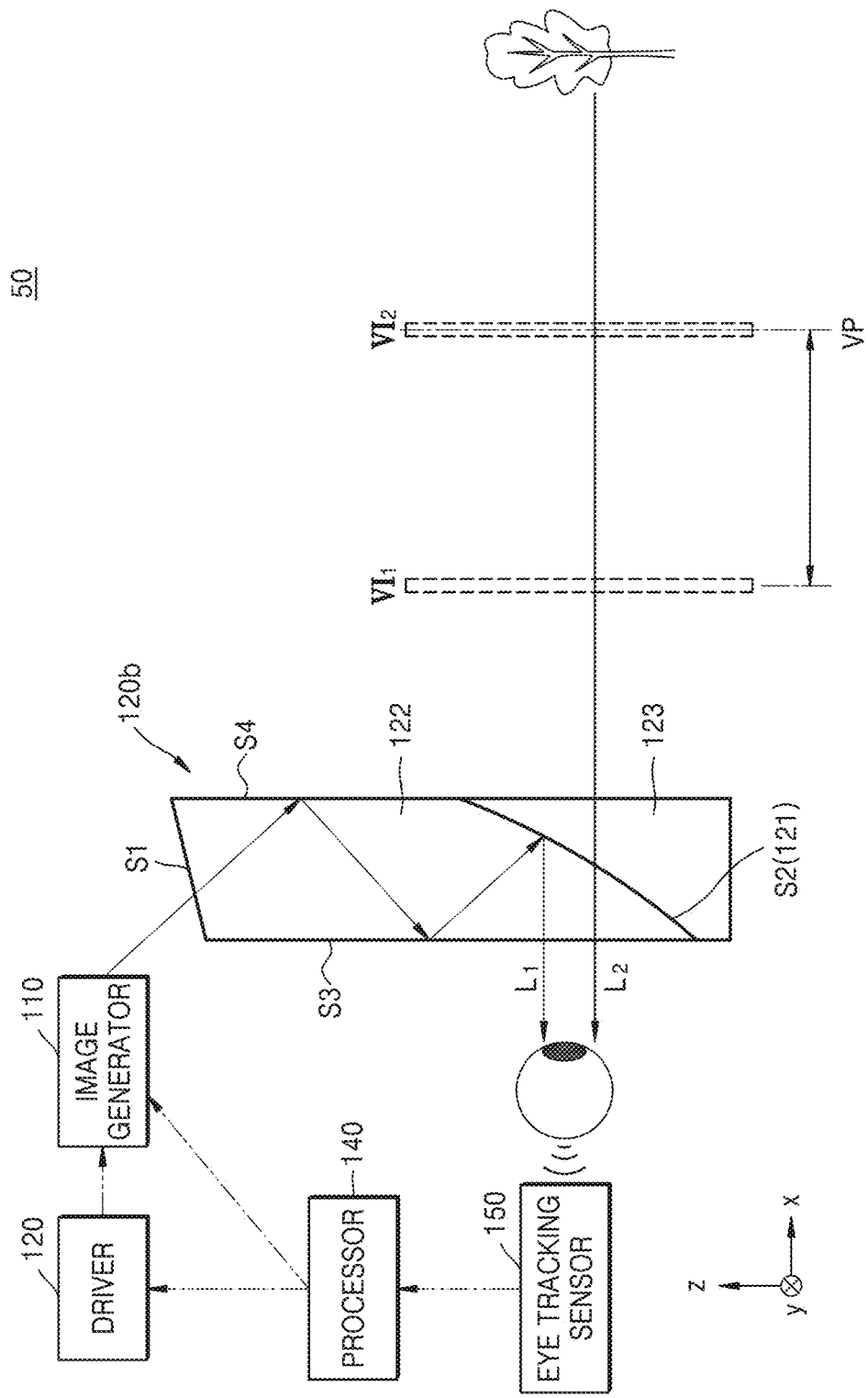
FIG. 11 is a view of a display apparatus including an optical system having a light transmission plate, according to an example embodiment.

FIG. 11 is a view of a display apparatus including the optical system 120 having a light transmission plate 123, according to an example embodiment. Compared with the optical system 120a of FIG. 6, the optical system 120b of FIG. 11 may further include the light transmission plate 123 that contacts the waveguide 122. The light transmission plate 123 may include a curved surface having a complementary shape to the freeform surface 121, and may share the third surface S3 and the fourth surface S4 of the waveguide 122. The light $L_2$ containing the external environment that is incident on the fourth surface S4 may sequentially pass through the freeform surface 121 and the third surface S3 to be incident on the observer's eye.

To reflect the light $L_1$ containing an image and transmit the light $L_2$ containing the external environment, a transflective film may be arranged on the freeform surface 121. The transflective film may simply reflect part of incident light and transmit the remaining part of the light. Then, part of the light $L_1$ containing an image may be reflected by the transflective film at the freeform surface 121 to travel toward the observer's eye, and part of the light $L_2$ containing the external environment may transmit through the transflective film at the freeform surface 121 to travel toward the observer's eye.

When the light $L_1$ containing the image generated in the image generator 110 exhibits polarization characteristics, the transflective film may be configured to reflect light having a specific polarization component and transmit light having other polarization component. For example, when the light $L_1$ containing a virtual image has a first polarization component, the transflective film may reflect light having the first polarization component and transmit light having a second polarization component perpendicular to the first polarization component.

Although, in the drawings, the transflective film is positioned to contact the freeform surface 121, embodiments are not limited thereto. For example, the transflective film and the freeform surface 121 may be arranged apart from each other on the waveguide 122.

Figure 12:
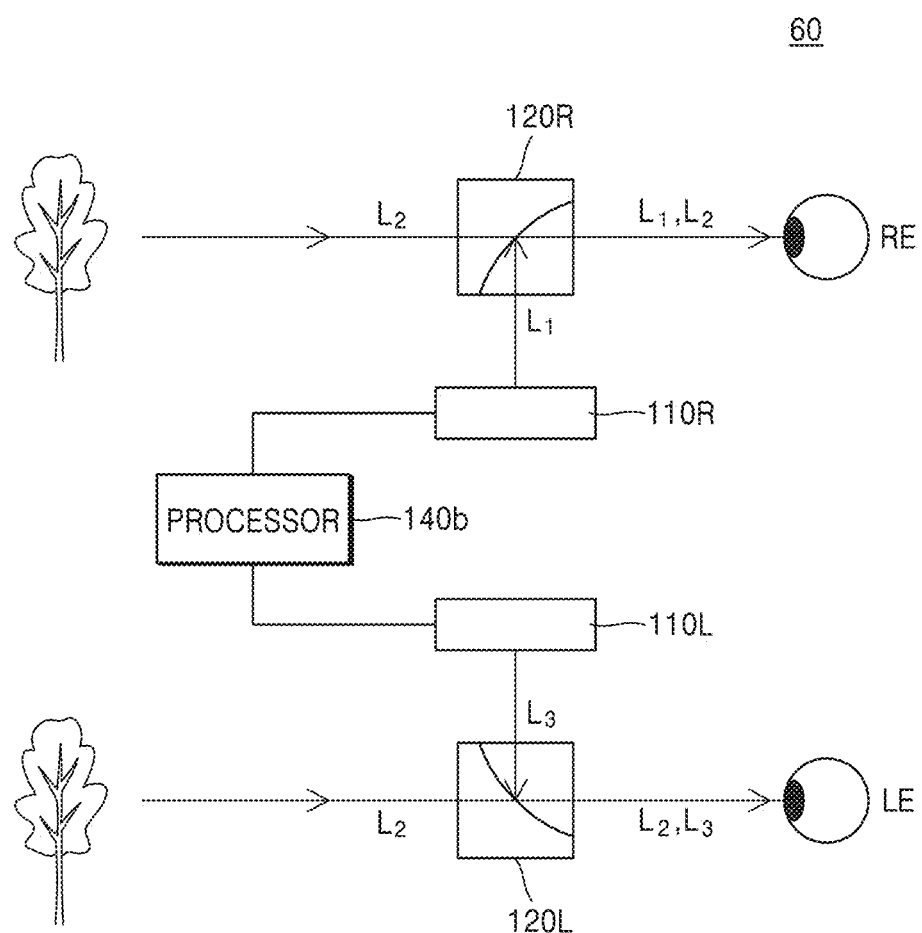
FIG. 12 is a view of a display apparatus for providing an image to each of both eyes, according to an example embodiment.

FIG. 12 is a view of a display apparatus 60 for providing an image to each of both eyes, according to an example embodiment. Images provided to both eyes may be the same, or may be images having parallax information.

The display apparatus 60 may include a first image generator 110R for generating an image for the right eye, a first image convergence member 120R for converging the image for the right eye and a real environment into one area, a first image generator 110L for generating an image for the left eye, a second image convergence member 120L for converging the image for the left eye and a real environment into one area, and a processor 140b for controlling the first and second image generators 110R and 110L to display images at a representative depth.

The first and second image generators 110R and 110L may respectively generate the image for the right eye and the image for the left eye, under the control of the processor 140b. As the first and second image generators 110R and 110L are already described above, detailed descriptions thereof are omitted.

The processor 140b may not only generate a light modulation signal for the first and second image generators 110R and 110L to generate images, but also determine a representative depth from the image information or the information received from the eye tracking sensor 150.

The first image convergence member 120R may change at least one of a first optical path $L_1$ of the image for the right eye or a second optical path $L_2$ of a real environment to converge the image and the real environment into one area. Here, the one area may be the right eye (RE) of the observer. The first image convergence member 120R may transfer a plurality of light rays along the first and second optical paths $L_1$ and $L_2$ to the observer's eye. The second image convergence member 120L may change at least one of a third optical path $L_3$ of the image for the left eye or the second optical path $L_2$ of the real environment to converge the image for the left eye and the real environment into one area. Here, the one area may be the left eye (LE) of the observer.

The first and second image convergence members 120R and 120L each may include the above-described freeform surface. In addition, the first and second image convergence members 120R and 120L each may further include, for example, a waveguide, a light transmission plate, a beam splitter, the transflective film, and the like.

The images transferred through the light of the first optical path $L_1$ and the third optical path $L_3$ may be images provided by an augmented reality apparatus. The real environment transferred through the light of the second optical path $L_2$ may be an environment that the observer faces through the augmented reality apparatus. The real environment may include a foreground that the observer faces, and may include a certain background subject.

Figure 13:
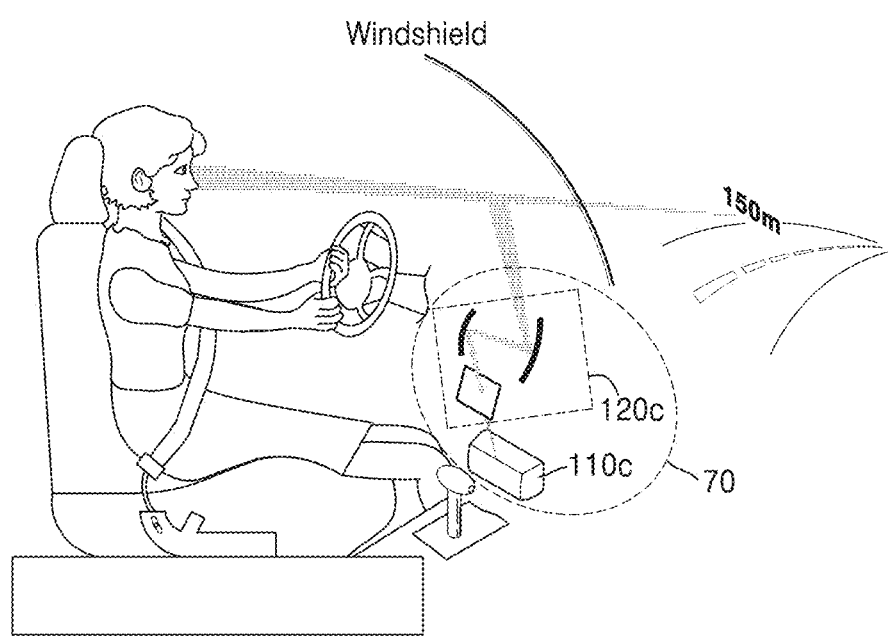
FIG. 13 is a view of an example of applying a display apparatus according to an example embodiment to a vehicle.

FIG. 13 is a view of an example of applying a display apparatus according to an example embodiment to a vehicle. A display apparatus may be applied to a head-up display apparatus 70 for a vehicle. The head-up display apparatus 70 may include an image generator 110c provided at an area of a vehicle, and at least one optical system 120d for changing an optical path for a driver to see an image generated in the image generator 110c. The optical system 120d may include a freeform optical system according to an example embodiment.

Figure 14:
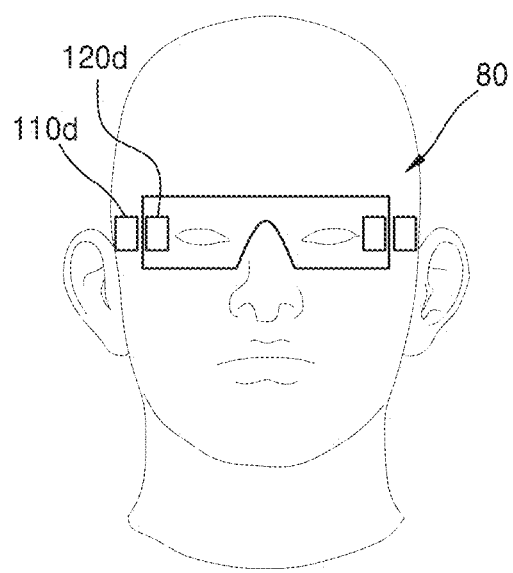
FIG. 14 is a view of an example of applying a display apparatus according to an example embodiment to augmented reality glasses or virtual reality glasses.

FIG. 14 is a view of an example of applying a display apparatus according to an example embodiment to augmented reality glasses 80 or virtual reality glasses. The augmented reality glasses 80 may include an image generator 110d for generating an image and an optical system 120d for guiding an image from the image generator 110d to enter the observer's eye. The optical system 120d may include the freeform optical system 120a according to an example embodiment.

In addition, the display apparatuses 10, 20, 30, 40, 50, and 60 according to the above-described example embodiments may be implemented as, for example, various types of wearable apparatuses, head mounted displays (HMDs), glasses-type displays, or goggle-type displays.

The above-described display apparatuses 10, 20, 30, 40, 50, and 60 may be operated by being in association with or connected to other electronic devices such as smartphones and the like. For example, a smartphone may be provided with a processor for driving an image generator. In addition, a smartphone may be provided with the above-described display apparatus.

As the above-described display apparatus includes a freeform surface that forms multiple depths, a clear virtual image may be provided.

The above-described display apparatus may be more easily applied to wearable devices, for example, glasses-type augmented reality display apparatuses and the like.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A display apparatus comprising:
an image generator configured to time-sequentially generate a plurality of images by modulating light; and
an optical system comprising a freeform surface that is configured to time-sequentially form a plurality of virtual images respectively corresponding to the plurality of images at different depths from a user's eye,
wherein each error value among error values between the plurality of images and the plurality of virtual images respectively corresponding to the plurality of images on the freeform surface is less than or equal to a profile value of the freeform surface,
wherein the profile value of the freeform surface corresponds to minimum values of a sum of the error values between the plurality of images and the plurality of virtual images respectively corresponding to the plurality of images.

2. The display apparatus of claim 1, wherein the error values are based on a difference in pixel values of pixels provided between the plurality of images generated in the image generator and the plurality of virtual images respectively corresponding to the plurality of images, on the freeform surface.

3. The display apparatus of claim 1, wherein the freeform surface is further configured to form the plurality of virtual images at different depths based on an optical path length between each of the plurality of images and the freeform surface.

4. The display apparatus of claim 3, wherein, as the optical path length between each of the plurality of images generated in the image generator and the freeform surface decreases, a depth of each of the plurality of virtual images corresponding to the plurality of images increases.

5. The display apparatus of claim 1, further comprising a processor configured to control the image generator based on at least one of depth information included in image information or information with respect to a depth that a user observes.

6. The display apparatus of claim 5, further comprising a driver configured to adjust a position of the image generator such that the image generator is configured to generate the plurality of images at different positions based on control of the processor.

7. The display apparatus of claim 6, wherein the driver comprises a shape changeable member configured to adjust a position of the image generator based on a change of a shape of the shape changeable member based on a signal applied to the driver.

8. The display apparatus of claim 7, wherein the shape changeable member comprises a material having a shape that changes by heat.

9. The display apparatus of claim 6, wherein the driver comprises at least one of a shape memory alloy or an electroactive polymer.

10. The display apparatus of claim 5, wherein the processor is further configured to generate a computer-generated hologram from the image information, and the image generator is further configured to generate the plurality of images having different representative depths based on the computer-generated hologram received from the processor.

11. The display apparatus of claim 5, further comprising an eye tracking sensor configured to track a depth that the user observes,
wherein the processor is further configured to control the image generator such that each of the plurality of virtual images are formed at the depth that the user observes.

12. The display apparatus of claim 1, wherein the optical system is a combiner configured to converge the plurality of virtual images and external light corresponding to an external environment into one focus point, and
wherein the freeform surface is integrated with the combiner.

13. The display apparatus of claim 12, wherein the combiner comprises a transparent waveguide configured to transmit the plurality of virtual images, and
wherein the freeform surface is provided at a surface of the transparent waveguide.

14. The display apparatus of claim 12, wherein the combiner further comprises a transflective film provided at the freeform surface.

15. The display apparatus of claim 1, wherein the display apparatus comprises an augmented reality apparatus.

16. The display apparatus of claim 1, wherein the image generator comprises:
a light source;
a lens; and
a spatial light modulator.

17. A method of operating a display apparatus including a freeform surface, the method comprising:
time-sequentially generating a plurality of images, by an image generator, by modulating light; and
time-sequentially forming, by the freeform surface, a plurality of virtual images respectively corresponding to the plurality of images at different depths,
wherein each error value among error values between the plurality of images and the plurality of virtual images respectively corresponding to the plurality of images on the freeform surface is less than or equal to a profile value of the freeform surface, and
wherein the profile value of the freeform surface corresponds to minimum values of a sum of the error values between the plurality of images and the plurality of virtual images respectively corresponding to the plurality of images.

18. The method of claim 17, wherein the error values are based on a difference in pixel values of pixels between the plurality of images generated in the image generator and the plurality of virtual images respectively corresponding to the plurality of images, on the freeform surface.

19. The method of claim 17, wherein, in the forming of the plurality of virtual images, the plurality of virtual images are formed at different depths based on an optical path length between each of the plurality of images and the freeform surface.

20. The method of claim 19, wherein as the optical path length between the plurality of images generated in the image generator and the freeform surface decreases, a depth of each of the plurality of virtual images corresponding to the plurality of images increases.

21. The method of claim 17, further comprising tracking a depth that a user observes,
wherein, in the forming of the plurality of virtual images, each of the plurality of virtual images is formed at the depth that the user observes.

* * * * *